United States Patent
Archer et al.

(10) Patent No.: US 6,277,242 B1
(45) Date of Patent: Aug. 21, 2001

(54) CREPING ADHESIVE CONTAINING AN ADMIXTURE OF PAE RESINS

(75) Inventors: Sammy L. Archer, Lynnwood, WA (US); Robert E. Dristas, Canonsburg; Ross T. Gray, Moon Township, both of PA (US)

(73) Assignee: Calgon Corporation, Naperville, IL (US)

( * ) Notice: Subject to any disclaimer, the term of this patent is extended or adjusted under 35 U.S.C. 154(b) by 0 days.

(21) Appl. No.: 09/514,778

(22) Filed: Feb. 28, 2000

(51) Int. Cl.[7] .............................. B31F 1/12; D21H 15/00
(52) U.S. Cl. ..................... 162/111; 162/164.3; 162/164.6
(58) Field of Search ..................................... 162/111, 112, 162/164.3, 164.6; 264/283

(56) References Cited

U.S. PATENT DOCUMENTS 3,640,841 * 2/1972 Winslow et al. ..................... 162/112
5,316,623 * 5/1994 Espy ................................... 162/164.3
5,660,687 * 8/1997 Allen et al. ........................... 162/111

* cited by examiner

Primary Examiner—Peter Chin
(74) Attorney, Agent, or Firm—Michael B. Martin; Thomas M. Breininger

(57) ABSTRACT

A creping adhesive for applying to a creping surface in the process for dry creping tissue and or towel paper is disclosed. The adhesive comprises a blend of at least two water-soluble cationic polyamide-epihalohydrin (PAE) resins. The first PAE resin has a mole ratio of epihalohydrin to secondary amine groups of the polyamine ranging from about 0.5:1.0 to about 1.8:1.0; and the second PAE resin has a mole ratio of epihalohydrin to secondary amine groups of the polyamine less than 0.5:1.0. The weight percent of the solids in the admixture or blend in an aqueous solution ranges from about 40% to about 0.01% solids, wherein the solids in this admixture are comprised of from about 0.1% to about 50.0% by weight of the first PAE resin and from about 99.9% to about 50.0% by weight of the second PAE resin. Varying the percentages of the two PAE resins in the creping adhesive can produce desired levels of adhesion and water resistance for given grades of tissue and/or towel paper products.

16 Claims, 4 Drawing Sheets

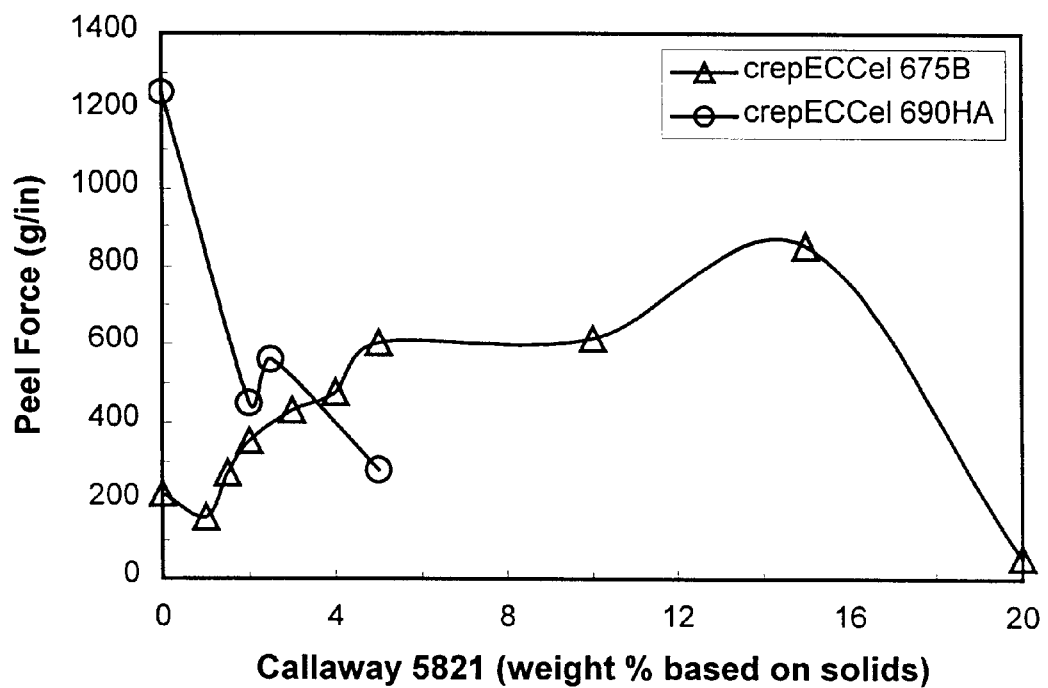
Figure 1. Peel force versus Callaway 5821 addition.

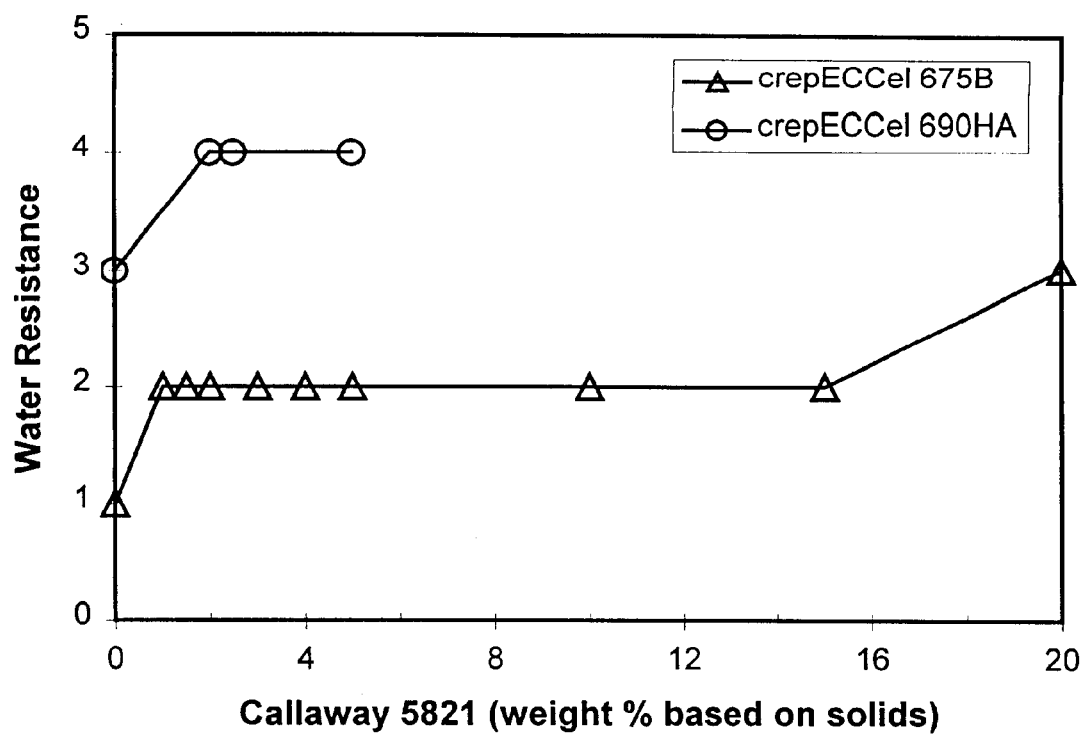
Figure 2. Coating durability versus Callaway 5821 addition.

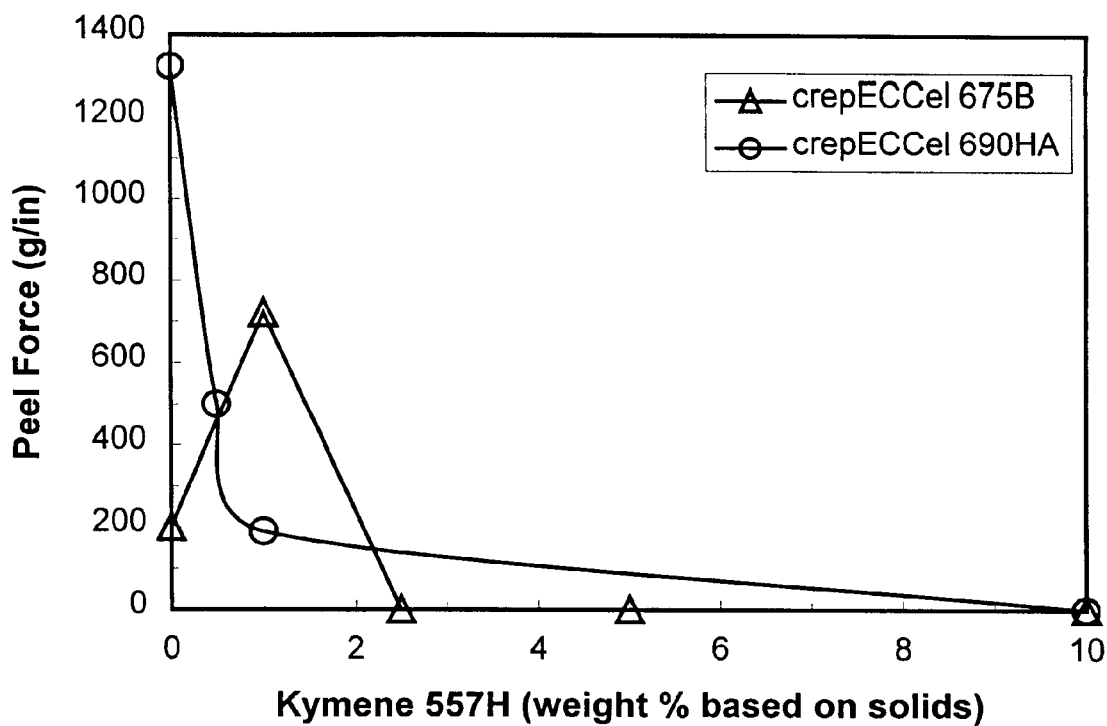
Figure 3. Peel force versus Kymene 557H addition.

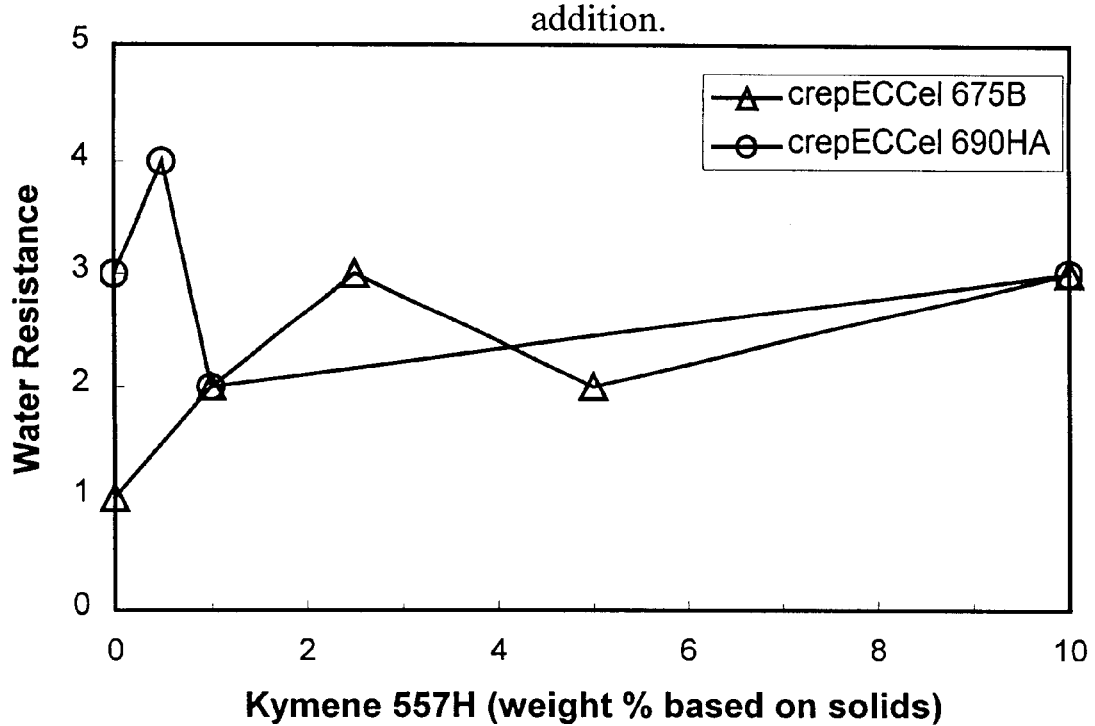
Figure 4. Water resistance versus Kymene 557H addition.

CREPING ADHESIVE CONTAINING AN ADMIXTURE OF PAE RESINS

FIELD OF THE INVENTION

The invention relates generally to a creping adhesive blend or admixture that is generally applied to a creping surface in the process for creping tissue and/or towel products and a related process.

BACKGROUND OF THE INVENTION

In the manufacture of certain wet-laid paper products, such as facial tissue, bathroom tissue, or paper towels, the web is conventionally subjected to a creping process in order to give the web desirable textural characteristics, such as softness, bulk, stretch, and absorbency. The creping process involves the adhering of the web to a rotating creping cylinder, such as an apparatus known as a Yankee dryer, and then dislodging the adhered web from the cylinder with a doctor blade. The impact of the web against the doctor blade ruptures some of the fiber-to-fiber bonds within the web and causes the web to wrinkle or pucker.

The severity of this creping action is dependent upon several factors, one of which is the degree of adhesion between the web and the surface of the creping cylinder. Greater adhesion causes increased softness, although generally with some loss of strength. In order to increase adhesion, a creping adhesive is generally sprayed onto the surface of the creping cylinder to enhance any naturally occurring adhesion that the web may have due to its water content when applied to the creping cylinder. The water content of the web will vary widely depending on the extent to which the web had been previously dried.

Generally, creping aids are comprised of an adhesive component and a release component. Creping aids should prevent wear of the dryer surface, provide lubrication between the doctor blade and the dryer surface, and reduce chemical corrosion, as well as control the extent of creping.

A wide variety of creping adhesives are known in the art. Examples of creping adhesives are polyvinyl alcohol, ethylene/vinyl acetate copolymer, animal glue, polyamidoamine-epichlorohydrin resins (PAE resins) and polyvinyl acetate.

U.S. Pat. No. 4,528,316 discloses a creping adhesive comprising an aqueous admixture of polyvinyl alcohol and a water-soluble, thermosetting, cationic polyamide resin which provides increased adhesion in the manufacture of creped wadding.

U.S. Pat. No. 5,338,807 discloses a creping aid comprising the reaction product of a polyamide of a dibasic acid or of the ester of an aliphatic dibasic acid and methyl bis (3-aminopropylamine) with epichlorohydrin in a mole ratio of the polyamide to the epichlorohydrin between about 1:0.1 and about 1:0.33.

U.S. Pat. No. 5,382,323 discloses an improved halogen-free adhesive obtained by reacting adipic acid with diethylenetriamine at equimolar ratios of from 1.2:1.0 to 1.0:1.2 and then crosslinking with a dialdehyde selected from gluteraldehyde, glyoxal, or mixtures thereof. Improved adhesion and full strength are obtained.

U.S. Pat. No. 5,944,954 discloses a creping adhesive comprising cationic starch and optionally a polyvinyl alcohol and a water-soluble thermosetting cationic polyamide-epihalohydrin resin which provides high adhesion and doctorability for dry creping.

The amount of adhesion between the web and the metal surface of the creping cylinder of the Yankee dryer at the creping or doctor blade plays a significant role in the development of the properties of the tissue and/or towel product. Soerens, in U.S. Pat. No. 4,501,640 has demonstrated that increased adhesion provided by creping adhesives (Yankee dryer adhesives) gives increased softness to the manufactured tissue. Therefore, the ability to provide increased adhesion of the wet paper sheet or web to the Yankee dryer surface is a desirable attribute of a creping adhesive.

In addition to providing a desirable amount of adhesion, it is also desirable to prevent wear of the Yankee dryer surface. Thus, the creping adhesive must provide a coating that is durable enough to withstand the mechanical forces at the doctor blade. In the past, this was commonly done using a resin that crosslinked to a great extent onto the Yankee dryer surface. These resins were typically polyamidoamine-epichlorohydrin polymers that are referred to as PAE resins. Some such PAE resins are sold under the trade names Kymene®, Rezosol®, Cascamid®, and Amrez®. These PAE resins are available respectively from the Hercules Chemical Company, the Houghton Company, the Borden Company, and Georgia Pacific. Generally, these resins are sprayed onto the Yankee dryer; however, they may also be added to the pulp slurry at the wet end of the paper machine.

Some of these commercially available PAE resins are wet-strength resins that contain enough epichlorohydrin to crosslink substantially on the Yankee dryer surface. These resins provide a durable coating on the dryer surface and a low amount of adhesion of the web to the dryer. However, after a period of time, the coating can become hard and can build up unevenly to the extent that the coating causes poor creping. Thus, the coating must be removed through the use of an abrasive.

The level of adhesion of the papermaking web to the Yankee dryer is important as it relates to the control of the web in its travel in the space between the creping or doctor blade and the winder upon which a roll of paper is being formed. Webs that are insufficiently adhered tend to cause poor control of the sheet with consequent difficulties in forming a uniform reel of paper. A loose sheet between the creping or doctor blade and the reel generally will result in wrinkles, foldovers, or weaving of the edges of the sheet in the rolled-up paper. Poorly formed rolls not only affect the reliability of the papermaking operation, but also tend to affect subsequent operations wherein the rolls are converted into a tissue or a towel product. The level of adhesion of the papermaking web to the Yankee dryer is also of vital importance as it relates to the drying of the web. Higher levels of adhesion improve heat transfer, thus causing the web to dry faster resulting in a more energy efficient, higher speed operation of the creping process.

Other commercially available resins are similar to the wet-strength PAE resins discussed hereinabove but have a much lower amount of crosslinking agent. This type of resin generally yields a coating that has moderate adhesion. However, the water resistance may tend to be "too" low due to the water solubility that results from having a low amount of crosslinking agent.

It is recognized in the industry that there is a need for an adhesive creping aid that provides a coating on the Yankee dryer that maintains a desired level of adhesion and water resistance while yielding a sheet of creped paper with the desired balance of properties.

SUMMARY OF THE INVENTION

The invention provides an aqueous solution useful as a creping adhesive comprised of an admixture or blend of at least two water-soluble cationic polyamide-epihalohydrin (PAE) resins. The two resins, referred to herein after as PAE resin (I) and PAE resin (II), are both made by the reaction of a polyalkylene polyamine having at least two primary amine groups and at least one secondary amine group with a dicarboxylic acid to form a long chain polyamide containing the recurring groups:

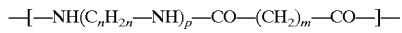

—[—NH(C$_n$H$_{2n}$—NH)$_p$—CO—(CH$_2$)$_m$—CO—]— wherein n=1 to 8; p=2 to 5; m=0 to 10.

Crosslinking is provided by reacting the resultant long chain polyamide with an epihalohydrin, such as epichlorohydrin. The difference between these two resins (I) and (II) is in the amount of crosslinking agent, i.e. epihalohydrin which is used. PAE resin (I) has a mole ratio of epihalohydrin to secondary amine groups of the polyamide from about 0.5 to 1.0 to about 1.8 to 1.0. PAE resin (II) has a mole ratio of epihalohydrin to secondary amine groups of the polyamide of less than 0.5 to 1.0.

The aqueous solution of the invention preferably comprises from about 60% to about 99.99% water by weight and from about 40% to about 0.01% solids by weight, and most preferably about 10% to about 20% solids by weight comprised of the creping adhesive of the invention. As discussed herein above, the creping adhesive of the invention is an admixture or blend of at least two water-soluble cationic polyamide-epihalohydrin (PAE) resins comprised of PAE resin (I) and PAE resin (II). Of the weight percent solids in the aqueous solution, PAE resin (I) constitutes from about 0.1% to about 50.0% solids by weight; more preferably, from about 0.1% to about 20.0% solids by weight; and most preferably, about 5.0% solids by weight. Of the weight percent solids in the aqueous solution, the PAE resin (II) constitutes from about 99.9% to about 50.0% solids by weight; more preferably, from about 99.9% to about 80% solids by weight; and most preferably about 95.0% solids by weight. Optionally, phosphoric acid and/or phosphate salt may be added to the aqueous solution to improve the flowability and wetting properties of the creping adhesive blend or admixture of the invention. Also, a small amount of a biocidal agent may be added to the aqueous solution in order to preserve the solution.

This aqueous solution may also be used in combination with a release aid that provides lubrication to the doctor blade and moderates the adhesive properties of the coating. The release aid may be of any type that is known to the industry.

The invention further provides a process for creping tissue paper, the process comprising:

a) applying to a rotating creping cylinder an aqueous solution comprising from about 60% to about 99.99% water by weight and from about 40% to about 0.01% solids by weight comprised of a creping adhesive admixture;

b) pressing a tissue paper web against the creping cylinder to effect adhesion of the web to the surface of the cylinder; and c) dislodging the web from the creping cylinder by contacting the web with a doctor blade, wherein the creping adhesive in step (a) comprises a first water-soluble cationic, polyamide-epihalohydrin (PAE) resin and a second water-soluble cationic, polyamide-epihalohydrin (PAE) resin, said polyamide of said first and said second polyamide-epihalohydrin resins having primary and secondary amine groups, and wherein said first PAE resin has a mole ratio of epihalohydrin to secondary amine groups of said polyamide ranging from about 0.5:1.0 to about 1.8:1.0, and said second PAE resin has a mole ratio of epihalohydrin to secondary amine groups of said polyamide less than 0.5:1.0. Of the solids in this admixture the first PAE resin is present in amount ranging from about 0.1% to about 50.0% by weight and the second PAE resin is present in an amount ranging from about 99.9% to about 50.0% by weight.

The tissue web can be comprised of various types of natural fibers including wood pulps of chemical and mechanical types. The tissue web can also be comprised of particulate fillers, such as kaolin clay, titanium dioxide, and/or calcium carbonate.

It is therefore an object of the present invention to provide a creping adhesive for use as a coating on a Yankee dryer for creping tissue and/or towel paper that maintains a moderate to high degree of adhesion; that is not easily washed from the Yankee dryer with water; and that does not result in a detrimental buildup of the coating such that the creping process would be impaired. This combination of properties can not be obtained when using any single creping adhesive or any creping adhesive blend presently available to the industry.

It is a further object of the present invention to provide a creping adhesive admixture or blend comprising at least two PAE resins whereby the blend ratio can be adjusted to provide a coating adhesive with any desired amount of adhesion and water resistance.

These and other objects of the invention will be better appreciated and understood by those skilled in the art from the following description of the drawings and the claims.

BRIEF DESCRIPTION OF THE DRAWINGS

FIG. 1 is a graph showing peel force values in grams per inch (g/in) of some creping adhesive admixtures of the invention.

FIG. 2 is a graph showing water resistance values of the creping adhesive admixtures of FIG. 1.

FIG. 3 is a graph showing peel force values in grams per inch (g/in) of further creping adhesive admixtures of the invention.

FIG. 4 is a graph showing water resistance values of the creping adhesive admixtures of FIG. 3.

DETAILED DESCRIPTION OF THE INVENTION

As used herein, the terms "tissue paper web, paper web, web, paper sheet, and paper product" all refer to sheets of paper made by a process comprising the steps of forming an aqueous papermaking furnish; depositing this furnish onto a foraminous surface, such as a Fourdrinier wire, and removing the water from the furnish either by gravity or by vacuum assisted drainage. The final steps of the tissue/towel making process involve adhering the sheet in a semi-dry condition onto the surface of a Yankee dryer, completing the water removal by evaporation to an essentially dry state, and removing the web from the Yankee dryer by means of a flexible creping blade onto a reel. An example of a paper machine and a papermaking process that may used in conjunction with the teachings of the invention are disclosed in U.S. Pat. No. 5,944,954, the general principles of which are incorporated herein by reference. However, it is to be understood that the creping adhesive admixture or blend of the invention can be used in other known papermaking processes and in other known paper machines for manufacturing tissue and/or towel paper products.

All percentages, ratios and proportions herein are by weight unless otherwise specified.

In its most general form, the invention is in the form of an aqueous solution that is useful as a creping adhesive and that comprises an admixture or blend of at least two different types of water-soluble cationic polyamide-epihalohydrin (PAE) resins.

The first water-soluble, cationic polyamide-epihalohydrin (PAE) resin, i.e. PAE resin (I), comprises the reaction product of an epihalohydrin and a long chain polyamide containing at least two primary amine groups and at least one secondary amine group.

Commercial supplies of particularly preferred polyamide-epihalohydrin resins for PAE resin (I) of the invention can be obtained from different companies. Examples are Kymene® and Crepetrol®, which are trademarks of Hercules, Inc. of Wilmington, Del.; Unisoft® and Rezosol®, which are trademarks of Houghton International, Inc. of Valley Forge, Pa.; and Callaway® 5821, which is a trademark of Callaway Corporation.

These PAE resins (I) which constitute the creping adhesive of the invention are generally supplied as a concentrated solution in water and are then diluted in order to be easily sprayed onto the cylinder of a Yankee dryer or onto a semi-dry tissue web.

The basic chemistry in the preparation of this water-soluble cationic polyamide-epihalohydrin (PAE) resin (I) is described in several patents. These patents are: U.S. Pat. No. 2,926,116 issued to Keim on Feb. 23, 1960; U.S. Pat. No. 2,926,154 issued to Keim on Feb. 23, 1960; U.S. Pat. No. 3,058,873 issued to Keim, et al. on Oct. 16, 1962; and U.S. Pat. No. 3,772,076 issued to Keim on Nov. 13, 1973, all of which are incorporated herein by reference. PAE resin (I) is generally used as a wet-strength resin, i.e. a resin added to the paper slurry at the wet end of the paper machine to impart a desired degree of strength to the manufactured paper when wet.

Preferably, and as stated herein above, PAE resin (I) of the invention comprises a water-soluble polymeric reaction product of an epihalohydrin with the secondary amine groups of a water-soluble polyamide.

The secondary amine groups of PAE resin (I) of the invention are preferably derived from a polyalkylene polyamine, for example, polyethylene polyamines, polypropylene polyamines or polybutylene polyamines and the like, with diethylenetriamine being preferred.

In the preparation of PAE resin (I), a dicarboxylic acid is first reacted with the primary amine groups of polyalkylene polyamine, preferably in aqueous solution, to form:

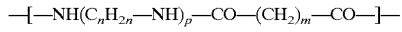

wherein n ranges from about 1 to 8; p ranges from about 2 to 5; m ranges from about 0 to 10. The resultant long-chain polyamide is reacted with an epihalohydrin, preferably epichlorohydrin, to form a water-soluble cationic polyamide-epihalohydrin resin.

The dicarboxylic acid is preferably one of the saturated aliphatic dibasic carboxylic acids containing from about 3 to about 10 carbon atoms, such as succinic, adipic, azelaic, and the like and mixtures thereof. Dicarboxylic acids containing from 4 to 8 carbon atoms are preferred, with adipic acid being most preferred.

Preferably, for PAE resin (I) the mole ratio of polyalkylene polyamine to dicarboxylic acid is from 0.8 to 1.0 to about 1.4 to 1.0. The mole ratio of epihalohydrin per mole secondary amine groups in the polyamide is preferably from about 0.5 to 1.0 to 1.8 to 1.0. The amount of epihalohydrin is enough to cause extensive crosslinking on the Yankee dryer to provide a hard and durable coating. PAE resin (I) is generally stored at low pH, i.e. pH ranging from 3 to 5 prior to its use in order to prevent the resin from gelling which tends to occur due to its high crosslinking ability.

The second water-soluble cationic polyamide-epihalohydrin (PAE) resin (II) comprises the reaction product of an epihalohydrin and a polyamide containing at least two primary amine groups and at least one secondary amine group.

Commercial supplies of particularly preferred polyamide-epihalohydrin resins for the PAE resin (II) of the invention can be obtained from Calgon Corporation, Pittsburgh, Pa., under its crepECCel™ trademarks.

This PAE resin (II) of the invention is generally supplied as a concentrated solution in water and is then generally diluted with water for easy spraying onto the cylinder surface of the Yankee dryer or onto a semi-dry tissue web.

Preferably, the polyamide-epihalohydrin (PAE) resin (II) of the invention comprises a water-soluble polymeric reaction product of epihalohydrin, such as epichlorohydrin, with the secondary amine groups of a water-soluble polyamide.

The secondary amine groups of the PAE resin (II) constituted in the creping adhesive of the invention are preferably derived from a polyalkylene polyamine, for example, polyethylene polyamines, polypropylene polyamines or polybutylene polyamines and the like, with diethylenetriamine being preferred.

In the preparation of PAE resin (II), a dicarboxylic acid is first reacted with the primary amine groups of polyalkylene polyamine, preferably in aqueous solution, to form a long chain polyamide containing the recurring groups:

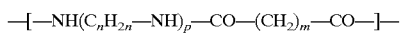

wherein n ranges from about 1 to 8; p ranges from about 2 to 5; and m ranges from about 0 to 10. The resultant polyamide is then reacted with epihalohydrin, preferably epichlorohydrin.

The dicarboxylic acid is preferably one of the saturated aliphatic dibasic carboxylic acids containing from about 3 to about 10 carbon atoms, such as succinic, adipic, azelaic, and the like and mixtures thereof. Dicarboxylic acids containing from 4 to 8 carbon atoms are preferred, with adipic acid being most preferred.

Preferably, the mole ratio of polyalkylene polyamine to dicarboxylic acid is from 0.8 to 1.0 to about 1.4 to 1.0. The mole ratio of epihalohydrin per mole secondary amine groups in the polyamide is preferably less than 0.5 to 1.0. This PAE resin (II) is usually available in its fully reacted form, i.e. it does not need to be stabilized by storing at low pH as does the PAE resin (I), which gels if not stored at low pH.

The amount of epichlorohydrin or crosslinking agent used in PAE resin (II) is less than that of PAE resin (I) and, therefore, PAE resin (II) does not become extensively crosslinked on the Yankee dryer. Thus, after PAE resin (II) is applied it can easily be washed off of the Yankee dryer with water more easily than PAE resin (I). This feature characterizes "low water resistance" for the PAE resin (II). Also as discussed herein above, this PAE resin (II) provides a coating with moderate to high wet tack adhesion.

PAE resin (I) is blended with PAE resin (II) in weight percents ranging from about 0.1% for resin (I) to about 99.9% for resin (II) to about 50.0% for resin (I) to about 50.0% for resin (II) based on the solids. This blend can be a concentrated aqueous solution or a diluted aqueous solution for use in a spray boom for application onto the Yankee dryer. The concentrated aqueous solution preferably comprises from about 60% to about 99.99% water by weight and from about 40% to about 0.01% solids by weight, and most preferably from about 10% to about 20% solids by weight, the solids being the resin blend of the invention.

The total amount of applied creping adhesive blend is preferably from about 0.1 lb/ton to about 10 lb/ton based on the dry weight of the creping adhesive blend and the dry weight of the paper web. The unit lb/ton, as used herein, refers to the dry amount of creping adhesive blend measured in pounds relating to the dry amount of paper measured in tons.

Optionally, phosphoric acid and/or phosphate salt may be added to the resin blend to improve the flowability and wetting properties of the resin blend on the Yankee dryer. If added, the amount of phosphoric acid and/or phosphate salt would range from about 18 to about 25 weight percent solids based on the dry weight of the resin blend. This phosphoric acid and/or phosphate salt can be added to the blend in dry form or in solution form. U.S. Pat. No. 4,883,564 issuing to Patrick P. Chen discloses the addition of phosphates (1–15% by weight) being added to an adhesive.

The inventors have found that a blend or admixture of PAE resin (I) and PAE resin (II) provides an improved creping adhesive that results in moderate to high wet tack adhesion with optimal water resistance. "Water resistance" was qualitatively determined by the ability to wash the coating from a low carbon steel plate that was used to mimic a Yankee dryer surface. In general, water resistance can range from 1 to 5. A water resistance rating of 2 means that the coating washes off easily with water without requiring any scrubbing. Thus, the coating is considered as being readily soluble. A water resistance rating of 4 or higher means that significant scrubbing is required to remove the coating. Thus, the coating is considered as being more insoluble in water.

The wet tack adhesion of several creping adhesives including the creping adhesive of the invention was measured using a peel test procedure. In the peel test procedure, a cloth strip was attached to a metal plate that was coated with the creping adhesive and then peeled at a 180° angle. The cloth strip used in the test was a 20"×2" cotton bed sheet having a 230-thread count. The metal plate to which the cloth was adhered was a 10"×4"×¾" low carbon steel block. This plate had a 10"×4" silicone rubber heating mat that was glued to its back. This heating mat was powered using a PID temperature controller. A J-type thermocouple, inserted through a 3/16" hole that was bored into the center of the plate, was used to provide a control signal.

In the peel test procedure, a creping adhesive film (10–15% solids) of the creping adhesive blend of the invention was uniformly applied to the test plate by a #40 coating rod. In order to cure the adhesive film the plate was heated to 100° C. and then maintained at this temperature for 10 minutes. The cloth strip was saturated with deionized water and then was blotted using a cotton blotting paper. The cloth strip was then carefully applied to the cured adhesive film by rolling the cloth strip with a 2-kilogram cylinder until uniform contact was achieved between the cloth and the cured adhesive film. The plate was then placed into a 120° C. oven for 15 minutes to allow the water to evaporate from the cloth strip. After the plate was removed from the oven, the plate with the attached cloth strip was mounted on an Instron® tensile tester. The cloth strip was then peeled off the plate at a 180° angle at a constant rate of 20 cm/min while the temperature of the plate was maintained at 100° C. The average force (in grams/inch) needed to peel the cloth from the plate was recorded as the wet tack adhesion.

EXAMPLES

The following examples illustrate the invention. These examples are intended to aid in the description of the present invention, however, in no way, should these examples be interpreted as limiting the scope thereof.

EXAMPLE 1

Various amounts of a Callaway® 5821 product, a PAE resin (I), i.e. having a molar ratio of epichlorohydrin to secondary amine between 0.5:1.0 and 1.8:1.0, were admixed with two different PAE resin (II) products. The Callaway® 5821 PAE resin (I) is available from Callaway Corporation. The two PAE resins (II) are products available from Calgon Corporation under the trade names crepECCel™ 675B and crepECCel™ 690HA. The PAE resins (II) have a molar ratio of epichlorohydrin to secondary amine less than 0.2:1.0. The crepECCel™ 675B PAE resin (II) has a molecular weight less than 50,000 and a solids content of 11.5%, and the crepECCel™ 690HA PAE resin (II) has a molecular weight greater than 500,000 and a solids content of 15%. The Callaway® 5821 PAE resin (I) was diluted from 40% solids to 15% solids prior to it being mixed with each of the two PAE resins (II),i.e. crepECCel™ 675B and crepECCel™ 690HA.

In this Example 1, Callaway® 5821 PAE resin (I) was added to both the crepECCel™ 675B PAE resin (II) and the crepECCel™ 690HA PAE resin (II) in amounts varying from 0% to 20% of the admixture, with the amounts of the two PAE resins (II) in the creping adhesive admixture varying from 100% to 80%.

The peel force test described herein above was conducted on each of the creping adhesive admixtures of the invention. The results are plotted in FIGS. 1 and 2. FIG. 1 shows the peel force for varying amounts of the Callaway® 5821 PAE resin (I) in each blend. FIG. 2 shows the water resistance for varying amounts of the Callaway® 5821 PAE resin (I) in each blend.

As can be seen in FIGS. 1 and 2, the addition of 4% to 16% of Callaway® 5821 PAE resin (I) to crepECCel™ 675B PAE resin (II) resulted in a significant increase in adhesion and an increase in water resistance compared to when crepECCel™ 675B PAE resin (II) was used alone. Such a creping adhesive would provide excellent creping and sheet control while being resistant to higher moisture contents of the paper web on the Yankee dryer. The increase in adhesion when using the creping adhesive admixture of the invention would tend to result in a softer sheet compared to when only the crepECCel™ 675B PAE resin (II) was used.

The crepECCel™ 690HA PAE resin (II) is shown in FIG. 1 as having an extremely high wet tack adhesion i.e. about 1200 g/in, and in FIG. 2 as having a moderate water resistance, i.e. 3. This high level of adhesion yields a high softness sheet. However, some grades of tissue and/or towel do not require such a high level of softness and/or some paper machines are not set up to crepe to such a high level of softness without causing the sheet to blow apart. For these grades of tissue and/or towel and for these types of paper machines, a more moderate peel force of 600 g/in would be desirable. The addition of approximately 2% of the Callaway® 5821 PAE resin (I) to the crepECCel™ 690HA PAE resin (II) yields this moderate peel force, i.e. about 470 g/in, as shown in FIG. 1 and a high water resistance, i.e. 4 as shown in FIG. 2.

It is evident from FIGS. 1 and 2 that one could produce a creping adhesive admixture of the invention with any desired peel force and "high" water resistance by admixing in various amounts of the Callaway® 5821 PAE resin (I) to either the crepECCel™ 675B PAE resin (II) or to the crepECCel™ 690HA PAE resin (II). This would allow the tissue and/or towel manufacture to tailor the creping adhesive to the particular grade being produced.

TABLE 1

Selected adhesive performance for Example 1

| Adhesive | Peel Force (g/in) | Water Resistance (1–5) |
|---|---|---|
| Callaway ® 5821 | 0 | 3 |
| crepECCel ™ 675B | 22.0 | 1 |
| 95% crepECCel ™ 675 B/ 5% Callaway ® 5821 | 600 | 2 |
| crepECCel ™ 690HA | 1250 | 3 |
| 97.5% crepECCel ™ 690HA/ 2.5% Callaway ® 5821 | 560 | 4 |
| Houghton ® 8290 | 0 | 2 |
| Houghton Unisoft ® 805 | 0 | 2 |

Table 1 is given in this Example to show the peel force and water resistance results for the Callaway® 5821 PAE resin (I), the crepECCel™ 675B PAE resin (II), and the crepECCel™ 690HA PAE resin (II) when used alone or when the latter PAE resins (II) are used in conjunction with Callaway 5821 PAE resin (I). It can be seen that desirable values resulted when the Callaway® 5821 PAE resin (I) was added to either the crepECCel™ 675B PAE resin (II) or to the crepECCel™ 690HA PAE resin (II). Two other competitive PAE resins (I) that are listed in Table 1 are the Houghton® 8290 and Houghton Unisoft® 805 products that are shown for further comparison to the creping adhesive admixture of the invention. The two latter PAE resins (I) have a peel force of 0 g/in. The lack of wet tack adhesion would lead to instability of the operation of the paper machine in view of its poor sheet control between the doctor blade and the reel onto which the tissue web is being wound.

EXAMPLE 2

Various amounts of Kymene® 557H product, a PAE resin (I), i.e. having a molar ratio of epichlorohydrin to secondary amine between 0.5:1.0 and 1.8:1.0, were admixed with two different PAE resin (II) products. The Kymene® 557H PAE resin (I) is available from Hercules Inc. The two PAE resins (II) are products available from Calgon Corporation under the trade names crepECCel™ 675B and crepECCel™ 690HA, and which products were used in Example 1. The Kymene® 557H PAE resin (I) was used at 12.7% (as received) and mixed into each of the two PAE resins (II), i.e. crepECCel™ 675B and crepECCel™ 690HA.

In this Example 2, Kymene® 557H PAE resin (I) was added to both the crepECCel™ 675B PAE resin (II) and the crepECCel™ 690HA PAE resin (II) in amounts varying from 0% to 10% of the admixture, with the amounts of the two PAE resins (II) in the creping adhesive admixture varying from 100% to 90%.

The peel force test described herein above was conducted on each of the creping adhesive admixtures of the invention. The results are plotted in FIGS. 3 and 4. FIG. 3 shows the peel force for varying amounts of the Kymene® 557H PAE resin (I) in each blend. FIG. 4 shows the water resistance for varying amounts of the Kymene® 557H PAE resin (I) in each blend.

As can be seen in FIGS. 3 and 4, the addition of 1% Kymene® 557H PAE resin (I) to crepECCel™ 675B PAE resin (II) resulted in a significant increase in adhesion and an increase in water resistance compared to when crepECCel™ 675B PAE resin (II) was used alone. Such a creping adhesive would provide excellent creping and sheet control while being resistant to higher moisture contents of the paper web on the Yankee dryer. The increase in adhesion when using the creping adhesive admixture of the invention would tend to result in a softer sheet when compared to the use of only the crepECCel™ 675B PAE resin (II).

The crepECCel™ 690HA PAE resin (II) is shown in FIG. 3 as having an extremely high wet tack adhesion, i.e. greater than 1200 g/in, and in FIG. 4 as having a moderate water resistance, i.e. 3. This high level of adhesion yields a high softness sheet. However, some grades of tissue and/or towel do not require such a high level of softness and/or some paper machines are not set up to crepe to such a high level of softness without blowing apart the sheet. For these grades of tissue and/or towel and for these types of paper machines, a more moderate peel force of 600 g/in is desirable. The addition of approximately 0.5% Kymene® 557H PAE resin (II) to the crepECCel™ 690HA PAE resin (II) yields this moderate peel force, i.e. greater than 500 g/in as shown in FIG. 3 and a high water resistance, i.e. 4 as shown in FIG. 4.

It is evident from FIGS. 3 and 4 that one could produce a creping adhesive with any desired peel force and "high" water resistance by admixing in various amounts of the Kymene® 557H PAE resin (I) to either the crepECCel™ 675B PAE resin (II) or to the crepECCel™ 690HA PAE resin (II). This would allow the tissue and/or towel manufacture to tailor the creping adhesive to the particular grade being produced.

TABLE 2

Selected adhesive performance for Example 2

| Adhesive | Peel Force (g/in) | Water Resistance (1–5) |
|---|---|---|
| crepECCel ™ 675B | 200 | 1 |
| 99% crepECCel ™ 675 B/ 1% Kymene ® 557H | 720 | 2 |
| crepECCel ™ 690HA | 1320 | 3 |
| 99.5% crepECCel ™ 690HA/ 02.5% Kymene ® 557H | 500 | 4 |
| Houghton ® 8290 | 0 | 2 |
| Houghton Unisoft ® 805 | 0 | 2 |

Table 2 is given in this Example to show the peel force and water resistance results for the Kymene® 557H PAE resin (I), the crepECCel™ 675B PAE resin (II), and the crepECCel™ 690HA PAE resin (II) when used alone or when the latter PAE resins (II) are used in conjunction with the Kymene® 557H PAE resin (I). It can be seen that desirable values resulted when the Kymene® 557H PAE resin (I) was added to either the crepECCel™ 675B PAE resin (II) or to the crepECCel™ 690HA PAE resin (II). Two other competitive PAE resins (I) listed in Table 2 were also listed in Table 1. These are the Houghton® 8290 and Houghton Unisoft® 805 products that are shown for further comparison to the creping adhesive of the invention. The two latter PAE resins (I) have a peel force of 0 g/in This lack of wet tack adhesion would lead to instability of the operation of the paper machine in view of its poor sheet control between the doctor blade and the reel onto which the tissue web is being wound.

While the present invention has been particularly set forth in terms of specific embodiments thereof, it will be understood in view of the instant disclosure that numerous variations upon the invention are now enabled yet reside within the scope of the invention. Accordingly, the invention is to be broadly construed and limited only by the scope and spirit of the claims now appended hereto.

What is claimed is:

1. A creping adhesive for preparing creped paper comprising an admixture of from about 0.1 to about 50 weight percent of a first polyamide-epihalohydrin resin and from about 99.9 to about 50 weight percent of a second polyamide-epihalohydrin resin, said first polyamide-epihalohydrin resin and said second polyamide-epihalohydrin resin each being made by the reaction of a polyalkylene polyamine having at least one secondary amine group with a dicarboxylic acid to form a long chain polyamide containing the recurring groups:

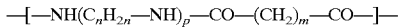

wherein n=1 to 8; p=2 to 5; m=0 to 10; and whereby the resultant reaction of each said first and said second polyamide-epihalohydrin resin is further reacted with epihalohydrin to produce said each first and second polyamide-epihalohydrin resin; and said first polyamide epihalohydrin resin having a mole ratio of said epihalohydrin to said secondary amine groups of said polyamide from about 0.5:1.0 to about 1.8:1.0, and said second polyamide-epihalohydrin resin having a mole ratio of said epihalohydrin to said secondary amine groups of said polyamide less than 0.5:1.0.

2. A creping adhesive according to claim 1 wherein said epihalohydrin in said first and second polyamide-epihalohydrin resin is epichlorohydrin.

3. A creping adhesive according to claim 1 wherein said long chain polyamide in said first and second polyamide-epihalohydrin resin is made by reacting adipic acid and diethylenetriamine.

4. A creping adhesive according to claim 1 wherein said creping adhesive is in aqueous solution form comprising about 60% to 99.99% water by weight and from about 40% to about 0.01% solids by weight, and wherein in said aqueous solution the weight percent solids of said first polyamide-epihalohydrin resin ranges from about 0.1% to about 50.0% and the weight percent solids of said second polyamide-epihalohydrin resin ranges from about 99.9% to about 50.0%.

5. A creping adhesive according to claim 4 wherein the weight percent solids of said first polyamide-epihalohydrin resin ranges from about 0.1% to about 20.0% and the weight percent solids of said second polyamide-epihalohydrin resin ranges from about 99.9% to about 80.0%.

6. A creping adhesive according to claim 5 wherein the weight percent solids of said first polyamide-epihalohydrin resin is about 5.0% and the weight percent solids of said second polyamide-epihalohydrin resin is about 95.0%.

7. A creping adhesive according to claim 1 wherein the amount of said creping adhesive admixture ranges from about 0.1 lb/ton to about 10 lb/ton based on the dry weight of the creping adhesive blend measured in pounds and the dry weight of the paper measured in tons.

8. A creping adhesive according to claim 1 wherein said admixture further comprising a phosphate salt in an amount ranging from about 18 to about 25 weight percent solids based on the dry weight of said admixture.

9. A process for creping tissue and/or towel paper comprising:

(a) applying to a rotating creping cylinder an aqueous solution comprising from about 60% to about 99.99% water by weight and from about 40% to about 0.01% solids by weight comprised of a creping adhesive admixture;

(b) pressing a tissue paper web against the creping cylinder to effect adhesion of the web to the surface of the cylinder; and (c) dislodging the web from the creping cylinder by contacting said web with a doctor blade, wherein the creping adhesive admixture in step (a) comprises from about 0.1 to about 50 weight percent of a first polyamide-epihalohydrin resin and from about 99.9 to about 50 weight percent of a second polyamide-epihalohydrin resin, said first polyamide-epihalohydrin resin and said second polyamide-epihalohydrin resin each being made by the reaction of a polyalkylene polyamine having at least one secondary amine group with a dicarboxylic acid to form a long chain polyamide containing the recurring groups:

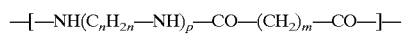

wherein n=1 to 8; p=2 to 5; m=0 to 10; and whereby the resultant reaction of each said first and said second polyamide-epihalohydrin resin is further reacted with epihalohydrin to produce said each first and second polyamide-epihalohydrin resin; and said first polyamide epihalohydrin resin having a mole ratio of said epihalohydrin to said secondary amine groups of said polyamide from about 0.5:1.0 to about 1.8:1.0, and said second polyamide-epihalohydrin resin having a mole ratio of said epihalohydrin to said secondary amine groups of said polyamide less than 0.5:1.0.

10. A process of claim 9 wherein said epihalohydrin in said first and second polyamide-epihalohydrin resin is epichlorohydrin.

11. A process of claim 9 wherein said long chain polyamide in said first and second polyamide-epihalohydrin resin is made by reacting adipic acid and diethylenetriamine.

12. A process of claim 9 wherein in said aqueous solution the weight percent solids of said first polyamide-epihalohydrin resin ranges from about 0.1% to about 50.0% and the weight percent solids of said second polyamide-epihalohydrin resin ranges from about 99.9% to about 50.0%.

13. A process of claim 12 wherein the weight percent solids of said first polyamide-epihalohydrin resin ranges from about 0.1% to about 20.0% and the weight percent solids of said second polyamide-epihalohydrin resin ranges from about 99.9% to about 80.0%.

14. A process of claim 13 wherein the weight percent solids of said first polyamide-epihalohydrin resin is about 5.0% and the weight percent solids of said second polyamide-epihalohydrin resin is about 95.0%.

15. A process of claim 9 wherein the amount of said creping adhesive admixture ranges from about 0.1 lb/ton to about 10 lb/ton based on the dry weight of the creping adhesive blend measured in pounds and the dry weight of the paper measured in tons.

16. A process of claim 9 wherein said admixture further comprising a phosphate salt in an amount ranging from about 18 to about 25 weight percent solids based on the dry weight of said admixture.

* * * * *